(12) United States Patent
Fu et al.

(10) Patent No.: US 8,190,377 B2
(45) Date of Patent: May 29, 2012

(54) ENHANCED RAIL INSPECTION

(75) Inventors: Chih-Chieh Fu, Taipei (TW); Ming Wang, Zhonghe (TW); Chih-An Wei, Zhubei (TW); Kevin Hsu, Toufen Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 352 days.

(21) Appl. No.: 11/940,864

(22) Filed: Nov. 15, 2007

(65) Prior Publication Data
US 2009/0132179 A1 May 21, 2009

(51) Int. Cl.
*G01B 3/44* (2006.01)
*B61B 3/00* (2006.01)
*B61K 9/04* (2006.01)

(52) U.S. Cl. .......... 702/34; 104/93; 246/169 D

(58) Field of Classification Search .......... 702/34, 702/33, 35–36, 40, 42–44, 56, 99, 104–105, 702/127, 130–132, 134–136; 701/19; 374/100, 374/117, E9.001, E5.001; 104/91, 93–95, 104/118–121; 105/26.05, 29.1, 72.2; 73/570, 73/577, 649, 655; 246/169 R, 169 D, 170
See application file for complete search history.

(56) References Cited

U.S. PATENT DOCUMENTS

| | | | |
|---|---|---|---|
| 5,341,683 A * | 8/1994 | Searle | 73/597 |
| 5,433,111 A * | 7/1995 | Hershey et al. | 73/593 |
| 7,616,329 B2 * | 11/2009 | Villar et al. | 356/625 |
| 7,659,972 B2 * | 2/2010 | Magnus et al. | 356/237.1 |
| 2004/0122569 A1 * | 6/2004 | Bidaud | 701/19 |
| 2006/0017911 A1 * | 1/2006 | Villar et al. | 356/4.01 |
| 2008/0281532 A1 * | 11/2008 | Church et al. | 702/40 |
| 2008/0304065 A1 * | 12/2008 | Hesser et al. | 356/400 |
| 2008/0306705 A1 * | 12/2008 | Luo et al. | 702/134 |

OTHER PUBLICATIONS

Lee et al., Dynamic Response of a Monorail Steel Bridge Under a Moving Train, 2006, Journal of Sound and Vibration 294, pp. 562-579.*

* cited by examiner

*Primary Examiner* — Michael Nghiem
*Assistant Examiner* — Toan M Le
(74) *Attorney, Agent, or Firm* — Slater & Matsil, L.L.P.

(57) ABSTRACT

Rail inspection is discussed that employs a monitor vehicle running on one or more tracks of a rail system that performs physical rail inspection in combination with monitoring and analysis of other system parameters that accompany the physical rail.

22 Claims, 5 Drawing Sheets

ENHANCED RAIL INSPECTION

TECHNICAL FIELD

The present invention relates, in general, to rail-based transportation, and, more particularly, to enhanced rail inspection.

BACKGROUND

Rail systems are used for a variety of different purposes. Passenger rail carries people over certain distances; freight rail transports goods and material from one location to another; and automated material handling systems (AMHS) transport a variety of different items or people around a particular industrial facility, such as a steel mill, microchip fabrication unit, or the like. Rail systems may often comprise mono-, dual-, or triple-rails, either configured on the ground, overhead, or a combination of both. Moreover, the rail cars may be configured to engage the rails at the top of the rail car, in which the rail car hangs below the rail, or at the bottom of the rail car, in which the rail car sits on top of the rail.

One consideration of the various rail systems is monitoring the conditions of the rails. Because most railroad car wheels physically contact the rail, rail damage and rail wear can sometimes cause rail failure, which, if not timely discovered, could lead to train derailment or the like. Derailment, whether for rail systems transporting people or goods, may cause catastrophic damage to goods, property, and the like, but may also cause loss of life for passengers or bystanders. In order to prevent such catastrophic failure, various systems and methods have been developed for inspecting rails.

A typical inspection system used to inspect railway tracks includes sensors, such as ultrasound sensors, eddy current sensors, and the like, that scan the tracks for known defect types, an analyzer to record and compile meaningful information from the scans, and data storage to store the analyzed information and/or the raw scan data. The sensors are generally placed in contact with or close proximity to the track/rail and are typically either attached to a wheel (or inspection wheel) that rolls over the track as the train moves or placed onto a carriage that attaches to the underside or some part of a train car close to the tracks.

Typically, such inspection systems require high resolution data. In order to obtain high resolution, the scan speeds are required to be substantially low such as 30 miles per hour. Such requirements impose a limitation on the train speed because as mentioned above, the sensors are typically mounted on the wheels or the undercarriage of the train. However, in order to perform real time inspection of the tracks, the inspection system is usually required to be implemented at higher speeds. A problem that often arises is that the obtained data resolution is significantly low as a result of higher speeds of operation. Data resolution is an important parameter for the accurate detection of flaws in railroad tracks.

Moreover, many modern rail systems, especially AHMS, include data transport mechanisms along the rail. Other rail systems include power transport, either over a separate rail, or some other related line. Most typical rail inspection systems test only the physical characteristics of the rail and leave monitoring of the additional data and power transport mechanisms to separate systems.

In AHMS systems used in industrial facilities, the current methods for maintaining the track system is to have plant management (PM) personnel manually/physically check the tracks. This manual process involves a great degree of manpower and loss of productivity when the rail system cannot be checked while the plant maintains normal operations. Moreover, in practice, manual inspection is conducted on more of a passive schedule, that is, when a problem is detected through some failure, correction and inspection is undertaken. Therefore, in many applications, the manual inspection does not typically prevent accidents or breakdowns, but only repairs such breakdowns or faults after the fact. Considering the manpower expended in manual inspection, the costs of maintaining the manpower and reacting to fault-events is very high.

SUMMARY OF THE INVENTION

These and other problems are generally solved or circumvented, and technical advantages are generally achieved, by preferred embodiments of the present invention which provides a monitor vehicle running on one or more tracks of a rail system that performs physical rail inspection in combination with monitoring and analysis of other system parameters that accompany the physical rail.

Representative embodiments of the present invention are directed to a method for inspecting a rail system that includes operating a monitor vehicle over one or more rails of the rail system, directing non-destructive energy from a first sensor of the monitor vehicle at the one or more rails, determining a physical rail integrity based on analysis of a reflection of the directed non-destructive energy from the one or more rails, measuring a temperature of the one or more rails by a second sensor on the monitor vehicle, and transmitting the determined physical integrity and the temperature to a data collection point.

Further representative embodiments of the present invention are directed to a rail monitor vehicle for a rail system. The rail monitor vehicle includes a drive mechanism for moving the rail monitor vehicle over one of one or more rails of the rail system and a plurality of sensors. The sensors include at least a temperature sensor and a rail deformation sensor. The rail monitor vehicle also includes a processor for processing raw data measured by the plurality of sensors and a communication interface configured to communicate the processed raw data to a data collection point.

Additional representative embodiments of the present invention are directed to a system for inspecting a rail system that includes a rail monitor vehicle operable to traverse one or more rails of the rail system, plurality of parameters of the rail system to measure, a plurality of alarm conditions corresponding to the plurality of parameters, and a data collection point. The rail monitor includes at least locomotive means, a plurality of sensors to measure the plurality of parameters, which include at least: rail deformation and rail temperature, and a processor for processing the measured plurality of parameters. When the measured parameters fall within the alarm conditions, the rail monitor vehicle transmits an alarm indicating the measured parameter for that alarm. The rail monitor vehicle otherwise communicates the measured plurality of parameters and the processed measured plurality of parameters to the data collection point.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1A:
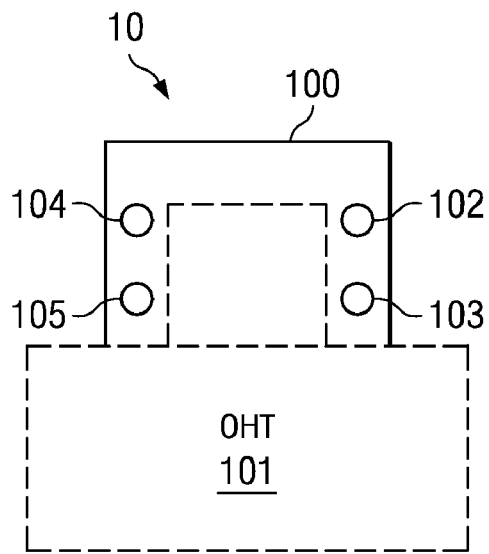
FIG. 1A is a diagram illustrating a typical over-head rail configuration.

FIG. 1A is a diagram illustrating typical over-head rail configuration 10. Rail 100 provides a connection point for over-head train (OHT) 101. The configuration of rail 100 includes power lines 102 and 104 and communication lines 103 and 105. Power lines 102 and 104 provide power for OHT 101 to move over rail 100. Communication lines 103 and 105 provide a path for communication signals which may be used both for providing communication information to OHT 101 regarding operation, such as a path, speed, direction, and the like, and may also provide a conduit for general communication information to be transmitted to any point along the route of rail 100.

Figure 1B:
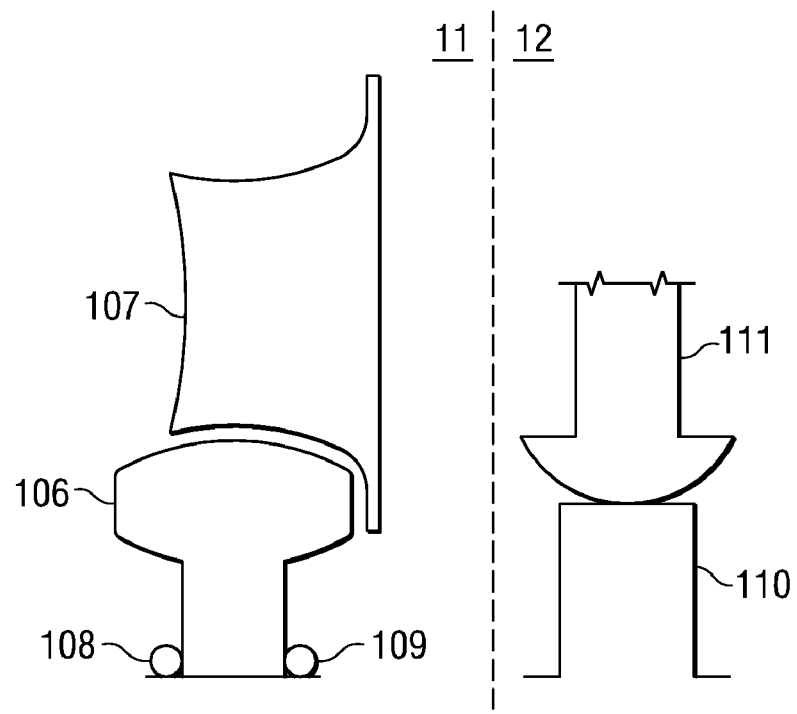
FIG. 1B is a diagram illustrating a typical on-ground rail system.

It should be noted that for simplicity, only a single rail is shown with respect to the examples illustrated in FIGS. 1A and 1B. The set-up and configuration for any additional number of rails, whether in a two or more rail system, would be similar to the configuration illustrated in FIGS. 1A and 1B. The illustration of the rail systems in these figures may either represent the configuration in a monorail system or may represent a single rail in a multi-rail system.

FIG. 1B is a diagram illustrating typical on-ground rail system 11. On-ground rail system 11 includes rail 106 and communication lines 108-109. Wheel 107 provides contact for a train car to rail 106. In typical embodiments, the train car provides its own power to drive the train. For example, a train engine using diesel engines for propulsion or to generate electricity for propulsion or some other form of drive mechanism, such as steam, superconducting electromagnets, and the like, drives wheel 107 in order to move the train over rail 106.

FIG. 1B also illustrates additional and/or alternative embodiments of an on-ground rail system, electric rail system 12, which includes power rail 110 (i.e., the "third rail"). Using contact 111, the train car obtains electricity from power rail 110 to drive the motors (not shown) turning wheel 107. Thus, in electric rail system 12, while the motors that drive wheel 107 are contained on the train, the power to drive those motors is obtained through power rail 110.

It should be noted that in additional and/or alternative embodiments of electric rail system 12, the power to drive the motors may be obtained from overhead power wires. Thus, instead of contact 111, the rail cars use another contact on top of the rail car that provides a connection to the overhead power wires.

Figure 2A:
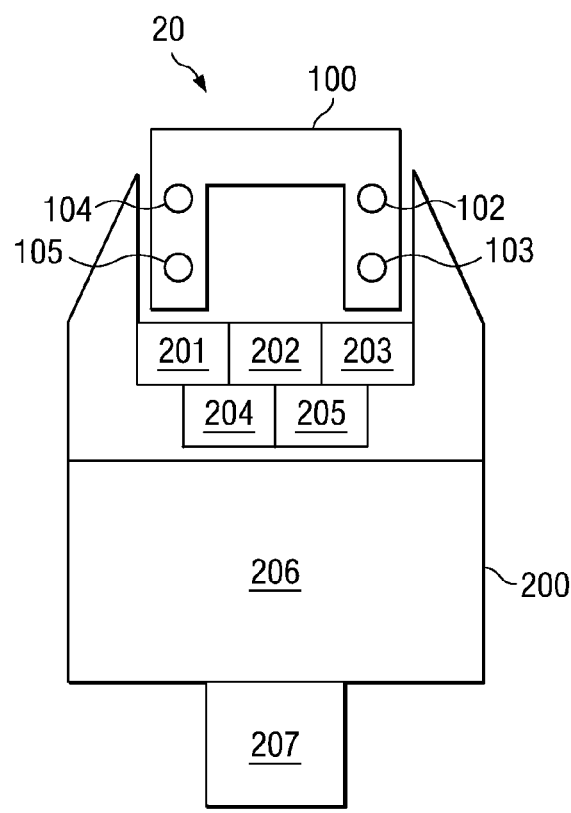
FIG. 2A is a diagram illustrating a rail monitor vehicle configured according to one embodiment of the present invention.

Turning now to FIG. 2A, rail monitor vehicle 200 is illustrated configured according to one embodiment of the present invention. Rail monitor vehicle 200 operates on an over-head rail system, such as over-head rail configuration 10 (FIG. 1A). Rail monitor vehicle 200 attaches to rail 100 and traverses rail 100 in the desired direction. Rail monitor vehicle 200 may obtain its locomotive power from power lines 102 and 104, or it may generate its own locomotive power through engines/motors within rail monitor vehicle 200. Rail monitor vehicle 200 contains a number of different sensors, such as rail sensor 201, vibration sensor 202, power line sensor 203, thermal sensor 204, and communication line sensor 205.

Rail sensor 201, which may comprise a laser sensor, a photo sensor, or the like, transmits and/or receives non-destructive energy at rail 100 in order to detect deformations in the rail. Rail sensor provides feedback as to when rail 100 has been deformed in some manner. Rail deformation can cause catastrophic failure of any rail system. Rail cars or rail vehicles may become derailed if too large of a deformation is encountered.

Vibration sensor 202, which may comprise an accelerometer, a displacement sensor, a velocity sensor, or the like, detects any vibration in rail 100. Vibration, whether excessive or simply constant, may provide undesirable cyclic stress to rail 100. Such forces may cause cracks to form from weak spots, or larger cracks to form from smaller cracks. Thus, knowledge of the amount of vibration occurring within rail 100 is important to safe operation.

Power line sensor 203, which may be a laser sensor, a photo sensor, or the like, measures the positioning and condition of power lines 102 and 104. Positioning of power lines 102 and 104 is often critical to safe operation of the rail system. Power lines 102 and 104 may become deflected from their safe position by having too much slack in the line, which may cause power lines 102 and 104 to bow out from their safe positions. Additionally, the insulation and/or covering of power lines 102 and 104 may become worn or chafed, such that the conductor within power lines 102 and 104 may be exposed to the outside. Having exposed, live conductors may be a fire hazard which affects the safe operation of the rail system and any systems surrounding the rail system, such as an industrial facility where the rail system may operate, or a population center that the rail system passes by. As with rail sensor 201, non-destructive energy is directed at power lines 102 and 104 which both determines whether power lines 102 and 104 have deviated from their respective safe positions and inspects the insulated housing for chafing, cracks, cuts, holes, and the like.

Thermal sensor 204, which may comprise an infrared (IR) thermometer or other non-contact or contact thermometer, detects the temperature of rail 100. When thermal sensor 204 is configured using a non-contact thermometer, it emits non-destructive energy directed at rail 100 which is then used to determine the temperature of rail 100. When implemented as a contact thermometer, thermal sensor 204 includes a probe that physically touches rail 100 to determine the temperature. Temperature is another debilitating factor that leads to deterioration of rail 100, power lines 102 and 104, and communication lines 103 and 105. If part of rail 100 runs too hot in contrast with another part, the difference in the thermal expansion may place unnecessary stress on rail 100 at the junction between the two different temperatures. Also, the cyclical expansion and contraction places the material of rail 100, power lines 102 and 104, and communication lines 103 and 105 under considerable stress. Thus, maintaining a watch over the temperature in rail system 20 is important.

Communication sensor 205, which may comprise some kind of signal generator, transceiver, or the like, tests the strength of the communication signal traveling in communication lines 103 and 105. In some example implementations of rail systems, communication lines 103 and 105 carry signals for controlling the rail vehicles. If there is a portion of communication lines 103 and 105 that is faulty, it is possible that the rail cars or vehicles will receive faulty operation signals or no signal at all. This could result in a rail vehicle that is out of control. Communication sensor 205 transmits and detects signals from communication lines 103 and 105 to test the strength and reliability of signals at that point of testing.

It should be noted that while each of rail sensor 201, vibration sensor 202, power line sensor 203, thermal sensor 204, and communication line sensor 205 has been described separately herein, any one or more of these sensors may be implemented using the same physical resource. For example, rail sensor 201 and power line sensor 203 may be implemented using the same laser or photo sensors. Where detection of the deformation of rail 100 and power lines 102 and 104 defines the function of rail sensor 201 and power line sensor 203, the same laser or photo sensor may examine and determine such deformation or deflections. The various embodiments of the present invention are not limited to only having a certain number of independently implemented sensors.

In order to make sense of the raw measurements and readings performed by rail sensor 201, vibration sensor 202, power line sensor 203, thermal sensor 204, and communication line sensor 205, processor 206 processes the raw data. Some applications may provide for real-time alarms, such that if any of the parameters being measured or analyzed falls within some kind of alarm condition, an alarm is transmitted immediately notifying PM staff of the alarm condition. In this type of real-time application, processor 206 performs the analysis and comparison of the measured data to the alarm condition.

Transmitter 207 is a communication interface that provides wireless communication between rail monitor vehicle 200 and the PM system that operates over-head rail system 20. As processor 206 processes the information resulting from the measurements taken by the sensors, data is transmitted to the PM system for monitoring and management of over-head rail system 20. In selected embodiments of the present invention, alarms are transmitted in real time to the PM system in order to effectively manage over-head rail system 20. In additional and/or alternative embodiments of the present invention all of the measured and analyzed data is transmitted to the PM system in real time.

Figure 2B:
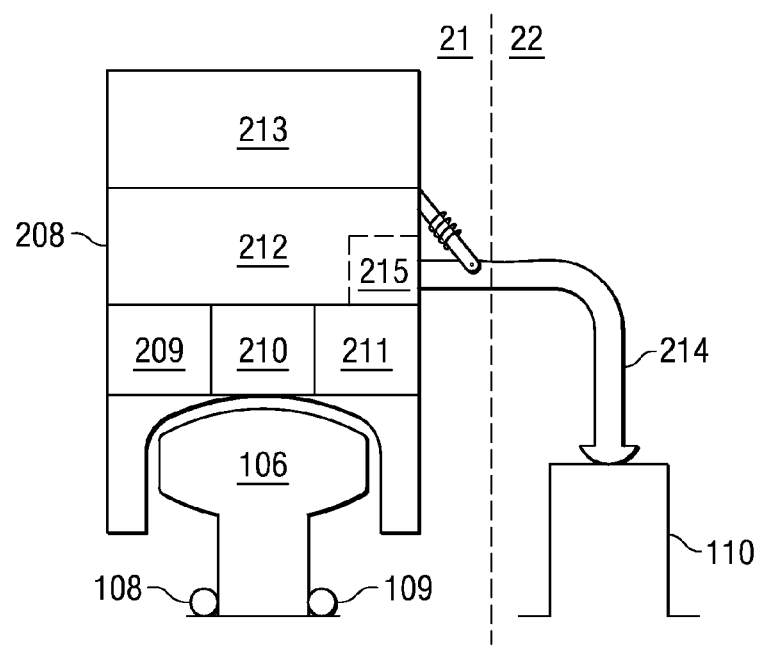
FIG. 2B is a diagram illustrating a rail monitor vehicle configured according to one embodiment of the present invention.

FIG. 2B is a diagram illustrating rail monitor vehicle 208 configured according to one embodiment of the present invention. Rail monitor vehicle 208 operates in rail system 21 which comprises rail configuration 11 (FIG. 1A). Rail monitor vehicle 208 attaches to rail 106 and traverses rail 106 in the desired direction. Rail monitor vehicle 208 includes rail sensor 209, crack sensor 210, and communication sensor 211.

Rail sensor 209 and communication sensor 211 (which is directed at communication lines 108 and 109) operate similarly to rail sensor 201 and communication sensor 205 (FIG. 2A). Crack sensor 210, which may comprise an x-ray unit, an ultrasound unit, a magnetic resonance unit, or the like, transmits non-destructive energy at rail 106 in order to detect any cracks or weak spots within the material of rail 106. Cracks or weak spots within rail 106 may lead to catastrophic failure of rail system 21. A rail may completely break apart or may simply experience a displacement or deformation within the middle of a rail, both of which could cause a rail car to derail.

Processor 212 processes and analyzes the raw data measured by rail sensor 209, crack sensor 210, and communication sensor 211. The processed analysis is then stored in storage media 213. Rail monitor vehicle 208 provides for non-real time monitoring of rail system 21. At pre-designated locations, rail monitor vehicle 208 downloads the analysis information from storage media 213 to a network (not shown) that is connected to the management system for rail system 21. There may be multiple pre-designated locations or just one depending on the desired configuration of rail system 21.

FIG. 2B also illustrates alternative rail system 22. Alternative rail system 22 includes power rail 110, which supplies power to rail vehicles, including rail monitor vehicle 208. In alternative rail system 22, rail monitor vehicle 208 includes power arm 214 which extends from the body of rail monitor vehicle 208 to make contact with power rail 110. By making this contact, power rail 110 supplies power to rail monitor vehicle 208 to move around on rail 106. Rail monitor vehicle 208 of alternative rail system 22 also includes power sensor 215. Power sensor 215 monitors the power coming from power rail 110. Power sensor 215 monitors whether there are any power spikes, the level of power, and the like. This information may be used to determine if power rail 110 is operating correctly at any given point.

It should be noted that in each of the rail systems and alternative rail systems illustrated in FIGS. 2A and 2B, rail monitor vehicles 200 and 208 include locomotive means, which is self-propelled or which obtains locomotive power from the rail system through a power line, such as power lines 102 and 104, an overhead wire, a dedicated rail, such as power rail 110, or the like.

Figure 3:
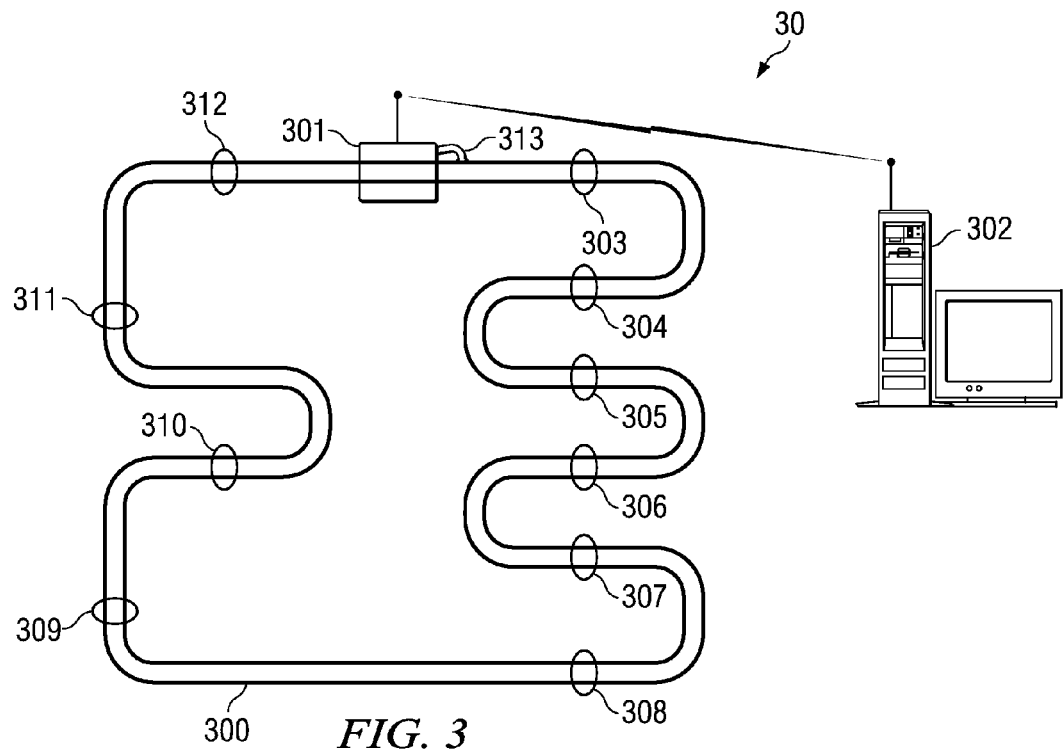
FIG. 3 is a block diagram illustrating an automated material handling systems (AMHS) configured according to one embodiment of the present invention.

FIG. 3 is a block diagram illustrating automated material handling systems (AMHS) 30 configured according to one embodiment of the present invention. AMHS 30 is located in a manufacturing plant, such as a semiconductor wafer fabrication (fab) unit. Track 300 provides the map that the intra-plant rail vehicles of AMHS 30 travel through operation. Monitor vehicle 301 also operates on track 300 inspecting various features and functions of track 300. In the embodiment illustrated in FIG. 3, monitor vehicle 301 continuously examines and inspects track 300, using such sensors as rail sensor 201, vibration sensor 202, power line sensor 203, thermal sensor 204, and communication line sensor 205 (FIG. 2A). However, it transmits any alarm data and/or analysis data to PM system 302 at certain designated intervals, report interval markers 303-312. As monitor vehicle 301 passes each of report interval markers 303-312, the current measured and analyzed data is transmitted from monitor vehicle 301 to PM system 302. There, managing personnel may view the data in order to perform appropriate maintenance on AMHS 30. This type of reporting is performed at a near real-time rate.

It should be noted that in additional and/or alternative embodiments of the present invention that a pure real-time reporting rate may be used. Monitor vehicle 301 may transmit the raw measured data and the processed data as it is measured and processed. In some additional and/or alternative embodiments, it may be favorable to perform only simple processing on monitor vehicle 301, in which case the raw measured data is transmitted almost like telemetry to the data collection point where the detailed processing occurs.

In addition to the parameters of track 300 measured and analyzed by the sensors of monitor vehicle 301, monitor vehicle 301 also includes vacuum 313. Vacuum 313 cleans particles from rail. In a clean environment, such as a wafer fab unit, particles that may end up on track 300 can potentially contaminate the semiconductor wafers or even cause more wear and tear on track 300. By utilizing vacuum 313, monitor vehicle 301 not only measures and analyzes certain parameters of track 300, but performs routine maintenance on it as well.

It should be noted that AMHS 30 may be operated automatically or manually. In an automatic mode, the path and/or time for monitor vehicle 301 to pass over track 300 may be scheduled by PM system 302. When the scheduled time arrives, monitor vehicle 301 automatically starts its inspection run. Alternatively, a human operator may manually control monitor vehicle 301 using operator input, thus, causing inspection of track 300 at any desired time. If realtime video data is being relayed to PM system 302, the operator may stop monitor vehicle 301 over any position of interest on track 300 and take a closer look at the interesting position or perform multiple passes of such position. Because the operator manually controls monitor vehicle 301, almost any desired inspection path may be employed.

It should further be noted that monitor vehicle 301, as illustrated in FIG. 3, may have a conspicuous shape or outline. The conspicuous shape or outline allows the monitor vehicle 301 to be seen by operators or other human observers when inspection and/or maintenance is being performed.

It should further be noted that AMHS 30 may be implemented either as an over-head rail system, an on-ground rail system, or any combination of the two. The various embodiments of the present invention are not limited to one or the other rail configuration.

Figure 4:
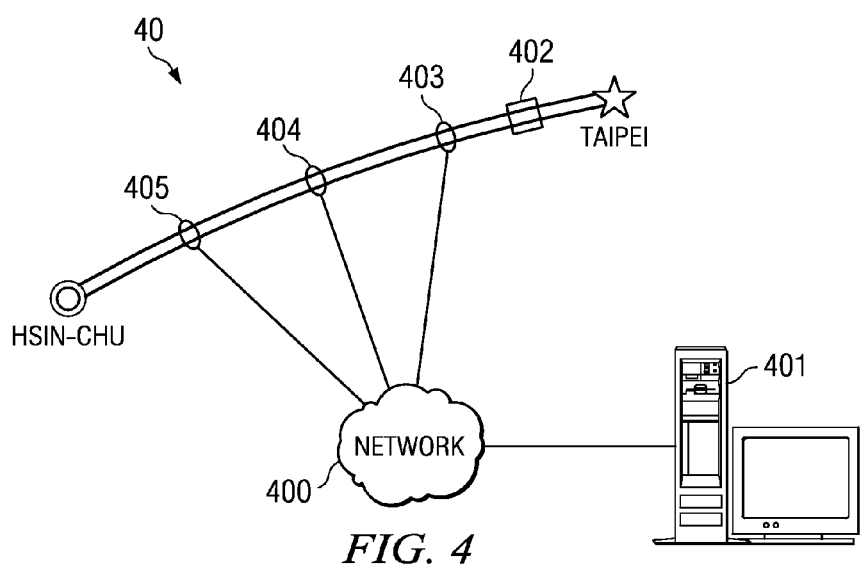
FIG. 4 is a block diagram illustrating a railway configured according to one embodiment of the present invention.

FIG. 4 is a block diagram illustrating railway 40 configured according to one embodiment of the present invention. In particular, railway 40 is a rail spur between Taipei and Hsin-Chu. Monitor vehicle 402 operates along railway 40 inspecting various desired parameters of railway 40. At designated intervals, report interval markers 403-405, the analyzed data from monitor vehicle 402 is transmitted to railway system 401 via network 400.

It should be noted that because rail monitor vehicles configured according to various embodiments of the present invention perform such monitoring and maintenance without specific human intervention, the path and routine of the monitor vehicles may be programmed and controlled automatically by software. This automated control allows for the reduction in the manpower used in examination/inspection of the rail systems. PM personnel may then program the monitor vehicles in AHMS 30 (FIG. 3) and/or railway 40 (FIG. 4) to follow the automated instructions. Thus, the monitor vehicles may be automatically scheduled to operate on the rails/tracks between regular schedules of the actual rail vehicles. This allows for automated monitoring of the rail systems around the regular use of those rail systems.

For example, referring back to FIG. 3, PM personal may use PM system 302 to program a monitoring schedule for monitor vehicle 301, so that monitor vehicle 301 operates between the rail vehicles transporting various materials around the fab unit floor. Similarly, referring back to FIG. 4, railway personnel may use railway system 401 to generate a schedule during which monitor vehicle 402 may operate inspecting the parameters of railway 40 between regularly scheduled passenger and freight trains scheduled between this Taipei-Hsin-Chu rail spur.

Figure 5:
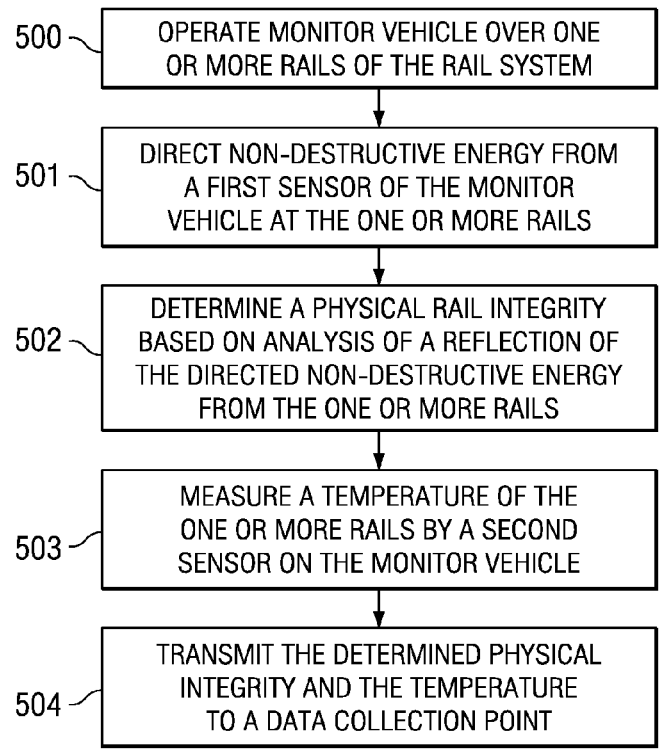
FIG. 5 is a flowchart illustrating example steps executed to implement one embodiment of the present invention.

FIG. 5 is a flowchart illustrating example steps executed to implement one embodiment of the present invention. In step 500, a monitor vehicle is operated over one or more rails of the rail system. Non-destructive energy is directed from a first sensor of the monitor vehicle, in step 501, at the one or more rails. A physical rail integrity is determined, in step 502, based on analysis of a reflection of the directed non-destructive energy from the one or more rails. A temperature of the one or more rails is measured by a second sensor on the monitor vehicle in step 503. In step 504, the determined physical integrity and the temperature are transmitted to a data collection point.

Figure 6:
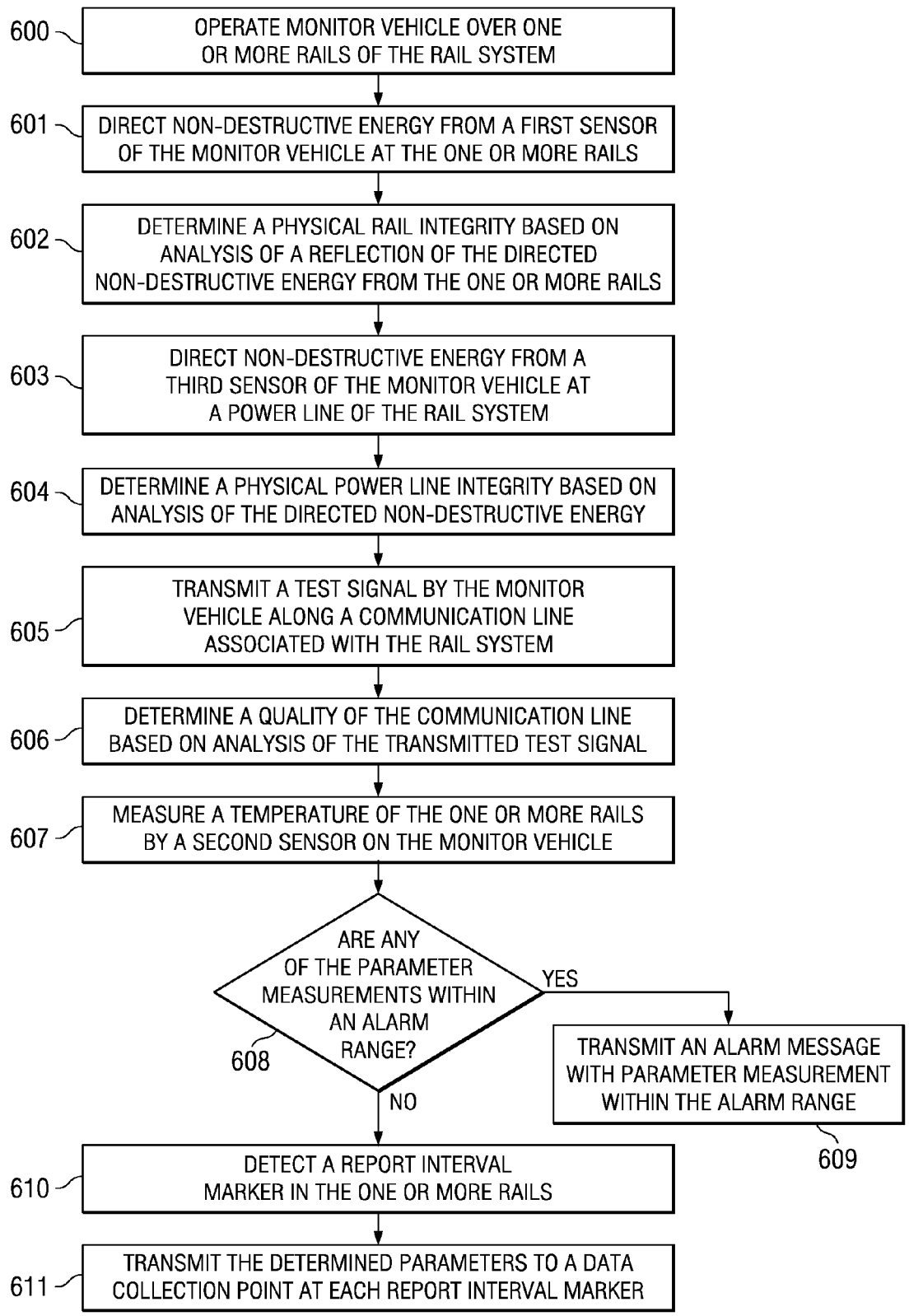
FIG. 6 is a flowchart illustrating example steps executed to implement one embodiment of the present invention.

FIG. 6 is a flowchart illustrating example steps executed to implement one embodiment of the present invention. In step 600, a monitor vehicle is operated over one or more rails of the rail system. Non-destructive energy is directed from a first sensor of the monitor vehicle at the one or more rails in step 601. A physical rail integrity is determined, in step 602, based on analysis of a reflection of the directed non-destructive energy from the one or more rails. Non-destructive energy is directed from a third sensor of the monitor vehicle at a power line of the rail system in step 603. A physical power line integrity is determined, in step 604, based on analysis of the directed non-destructive energy. A test signal is transmitted, in step 605, by the monitor vehicle along a communication line associated with the rail system. A quality of the communication line is determined, in step 606, based on analysis of the transmitted test signal. A temperature of the one or more rails is measured by a second sensor on the monitor vehicle in step 607. A determination is made in step 608, whether any of the parameter measurements fall within an alarm range. If so, in step 609, an alarm message is transmitted with the parameter measurements that are in the alarm range. Otherwise, a report interval marker is detected, in step 610, in the one or more rails. In step 611, the determined parameters are transmitted to a data collection point at each report interval marker.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a read-only memory (ROM), a flash memory, an erasable ROM (EROM), a floppy diskette, a compact disk (CD-ROM), an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 7:
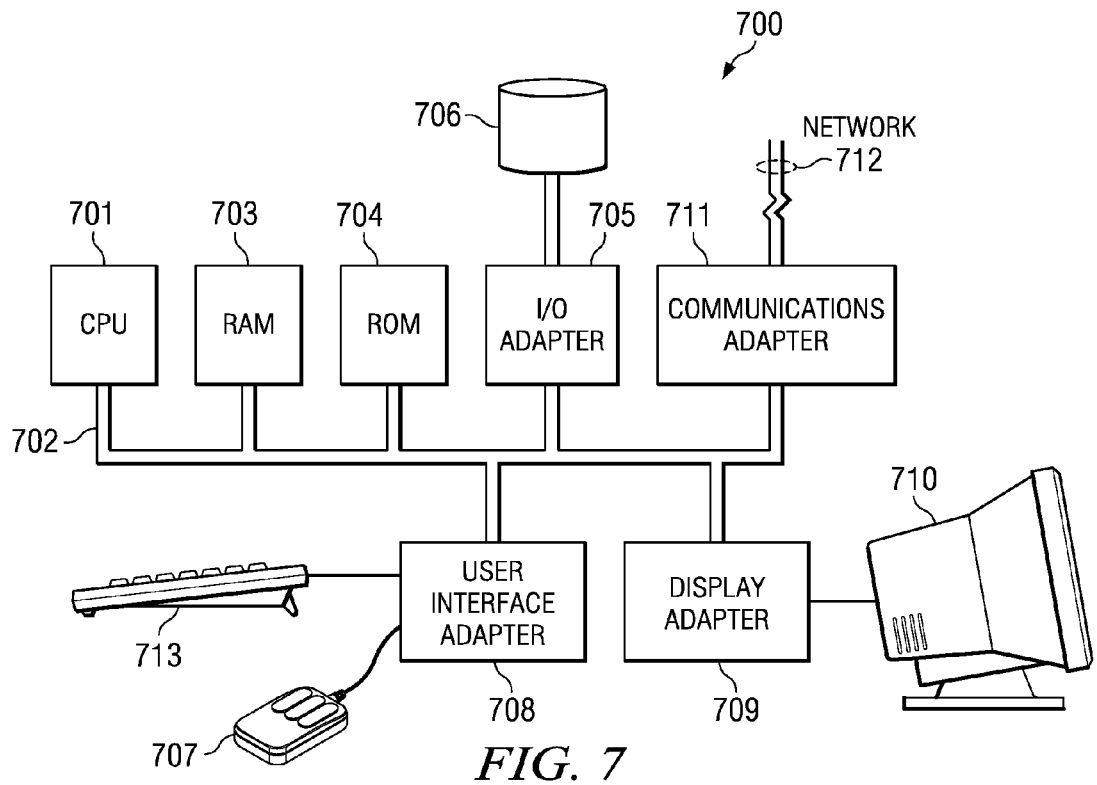
FIG. 7 is a block diagram illustrating a computer system adapted to use embodiments of the present invention.

FIG. 7 illustrates computer system 700 adapted to use embodiments of the present invention, e.g., storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) adapter 705, communications adapter 711, user interface 708, and display card 709. The I/O adapter 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer, e.g., dot matrix, laser, and the like, a fax machine, scanner, or a copier machine.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for inspecting a rail system comprising:
   operating a monitor vehicle over one or more rails of said rail system;
   directing non-destructive, electromagnetic energy from a first sensor of said monitor vehicle at said one or more rails;
   determining a physical rail integrity based on analysis of a reflection of said directed non-destructive energy from a solitary one of said one or more rails, wherein the reflection has bounced off of the surface of the one or more rails and returned to the monitor vehicle without entering the one or more rails;
   measuring a temperature of said one or more rails by a second sensor on said monitor vehicle;
   transmitting said determined physical rail integrity and said temperature to a data collection point;
   directing non-destructive energy from a third sensor of said monitor vehicle at a power line of said rail system;
   determining a physical power line integrity based on analysis of said directed non-destructive energy; and
   transmitting said determined physical power line integrity along with said determined physical integrity and said temperature.

2. The method of claim 1 further comprising:
   comparing said temperature to an alarm temperature condition;
   transmitting a temperature alarm responsive to said temperature meeting said alarm temperature condition; and
   transmitting a rail integrity alarm response to said determined physical rail integrity being abnormal.

3. The method of claim 1 further comprising:
   transmitting a power line alarm responsive to said determined physical power line integrity being abnormal.

4. The method of claim 1 further comprising:
   transmitting a test signal by said monitor vehicle along a communication line associated with said rail system;
   determining a quality of said communication line based on analysis of said transmitted test signal; and
   transmitting said quality along with said determined physical integrity and said temperature.

5. The method of claim 4 further comprising:
   transmitting a communication line alarm responsive to said determined quality being less than a predetermined level.

6. The method of claim 1 further comprising:
   detecting by said monitor vehicle additional parameters of said rail system, said additional parameters comprising one or more of:
   vibration;
   cracks;
   abrasions; and
   weak spots;
   wherein said detected additional parameters are transmitted along with said determined physical integrity and said temperature; and
   transmitting a parameter alarm responsive to said detected additional parameters being abnormal.

7. The method of claim 1 further comprising:
   detecting a report interval marker in said one or more rails; and
   wherein said transmitting is in response to said detecting.

8. The method of claim 1 wherein said operating comprises one or:
   automatically operating said monitor vehicle in response to computer control; or
   manually operating said monitor vehicle in response to operator input.

9. The method of claim 1 further comprising:
   receiving power from said rail system to operate said monitor vehicle.

10. The method of claim 1 further comprising:
    vacuuming by said monitor vehicle of dirt particles from said one or more rails.

11. A rail monitor vehicle for a rail system, said rail monitor vehicle comprising:
    a drive mechanism for moving said rail monitor vehicle over one of one or more rails of said rail system;
    a plurality of sensors, said plurality of sensors including at least:
    a temperature sensor; and
    a rail deformation sensor for sensing a deformation within a single one of the one or more rails without reference to another one of the one or more rails, the rail deformation sensor sensing a reflection of at least one form of light off of the single one of the one or more rails;
    a processor for processing raw data measured by said plurality of sensors;
    a communication interface configured to communicate said processed raw data to a data collection point; and
    a vacuum configured to vacuum particles from said one of said one or more rails.

12. The rail monitor vehicle of claim 11 further comprising:
    a power contact connecting to a power source provided by said rail system.

13. The rail monitor vehicle of claim 11 wherein said plurality of sensors further include one or more of:
    a power line deformation sensor;
    a communication line sensor;
    a crack sensor; and
    a vibration sensor.

14. The rail monitor vehicle of claim 11 wherein said drive mechanism and said plurality of monitors are contained in a housing, wherein said housing is conspicuously observable by a human observer.

15. The rail monitor vehicle of claim 11 wherein said drive mechanism is activated in response to one of:
   automated computer control; or
   operator input.

16. The rail monitor vehicle of claim 11 further comprising:
   a report interval marker detector, wherein said communication interface communicates said raw data and said processed raw data responsive to detecting a report interval marker by said report interval marker detector.

17. A system for inspecting a rail system comprising:
   a rail monitor vehicle operable to traverse one or more rails of said rail system, said rail monitor comprising:
      locomotive means;
      a plurality of sensors to measure a plurality of parameters of only a single one of the one or more rails of said rail system, said plurality of parameters including at least:
         communication line strength;
         rail deformation; and
         rail temperature; and
      a processor for processing said measured plurality of parameters;
   a plurality of alarm conditions corresponding to said plurality of parameters, wherein said rail monitor vehicle transmits an electronic wireless alarm for each of said measured plurality of parameters that falls within said plurality of alarm conditions; and
   a data collection point, wherein said rail monitor vehicle communicates said measured plurality of parameters and said processed measured plurality of parameters to said data collection point, wherein said rail monitor vehicle wirelessly transmits the electronic wireless alarm to said data collection point.

18. The system of claim 17 wherein said plurality of parameters further includes one or more of:
   rail cracking;
   power line integrity; and
   rail vibration.

19. The system of claim 17 wherein rail monitor vehicle is conspicuously observable by a human observer.

20. The system of claim 17 wherein said locomotive means of said rail monitor vehicle is controlled in response to one of:
   automated computer control; or
   operator input.

21. The system of claim 17 wherein said rail monitor vehicle further comprises:
   a power contact to receive power for said locomotive means from said rail system.

22. The system of claim 17 wherein said rail monitor vehicle further comprises:
   a vacuum configured to vacuum said one or more rails.

* * * * *